(12) United States Patent
Shen et al.

(10) Patent No.: US 8,772,190 B2
(45) Date of Patent: Jul. 8, 2014

(54) LARGE CERAMIC COMPONENT AND METHOD OF MANUFACTURE

(75) Inventors: Zhijian Shen, Solna (SE); Saeid Esmaeilzadeh, Stockholm (SE); Katarina Flodstrom, Stockholm (SE); Charlotte Vieillard, Woerden (NL)

(73) Assignee: AB SKF, Gothenburg (SE)

( * ) Notice: Subject to any disclaimer, the term of this patent is extended or adjusted under 35 U.S.C. 154(b) by 292 days.

(21) Appl. No.: 13/060,086

(22) PCT Filed: Aug. 29, 2008

(86) PCT No.: PCT/EP2008/061410
§ 371 (c)(1),
(2), (4) Date: Jun. 6, 2011

(87) PCT Pub. No.: WO2010/022788
PCT Pub. Date: Mar. 4, 2010

(65) Prior Publication Data
US 2011/0266719 A1  Nov. 3, 2011

(51) Int. Cl.
| | | |
|---|---|---|
| C04B 35/584 | (2006.01) | |
| C04B 35/599 | (2006.01) | |
| C04B 35/593 | (2006.01) | |
| C04B 35/645 | (2006.01) | |
| C04B 35/597 | (2006.01) | |
| C04B 35/626 | (2006.01) | |
| F16C 33/32 | (2006.01) | |

(52) U.S. Cl.
CPC .......... *C04B 35/593* (2013.01); *C04B 2235/96* (2013.01); *C04B 2235/5445* (2013.01); *C04B 2235/3869* (2013.01); *C04B 2235/6581* (2013.01); *C04B 2235/94* (2013.01); *C04B 2235/5436* (2013.01); *C04B 2235/95* (2013.01); *C04B 35/645* (2013.01); *C04B 2235/666* (2013.01); *C04B 2235/6567* (2013.01); *C04B 2235/661* (2013.01); *C04B 2235/775* (2013.01); *C04B 35/597* (2013.01); *C04B 2235/77* (2013.01); *C04B 2235/81* (2013.01); *C04B 2235/6562* (2013.01); *C04B 2235/3225* (2013.01); *C04B 2235/78* (2013.01); *C04B 2235/767* (2013.01); *C04B 2235/3217* (2013.01); *C04B 2235/3873* (2013.01); *C04B 35/62655* (2013.01); *C04B 2235/3865* (2013.01); *F16C 33/32* (2013.01); *Y10S 384/9071* (2013.01)
USPC ....... 501/97.1; 501/97.2; 501/97.3; 501/97.4; 501/98.1; 501/98.2; 501/98.3; 384/492; 384/907.1

(58) Field of Classification Search
USPC .............. 501/97.1–97.4, 98.1–98.3; 384/492, 384/907.1
See application file for complete search history.

(56) References Cited

U.S. PATENT DOCUMENTS

| | | | | |
|---|---|---|---|---|
| 5,015,608 | A * | 5/1991 | Matsuhisa et al. | 501/97.3 |
| 5,622,905 | A | 4/1997 | Matsuura et al. | |
| 5,698,156 | A * | 12/1997 | Matsuura et al. | 264/432 |
| 5,705,449 | A * | 1/1998 | Hirao et al. | 501/97.1 |
| 7,294,596 | B2 * | 11/2007 | Esmaeilzadeh | 501/98.1 |
| 7,612,006 | B2 * | 11/2009 | Komeya et al. | 501/97.2 |
| 2007/0225150 | A1 * | 9/2007 | Esmaeilzadeh | 501/88 |
| 2011/0260368 | A1 * | 10/2011 | Shen et al. | 264/434 |

FOREIGN PATENT DOCUMENTS

| | | | |
|---|---|---|---|
| JP | 05339060 | * | 12/1993 |
| JP | 07097266 A | | 4/1995 |
| JP | 10087369 | * | 4/1998 |
| JP | 10087369 A | | 4/1998 |
| JP | 2005-330178 | | 12/2005 |
| JP | 2005330178 A | | 12/2005 |
| WO | 2010/022788 | | 3/2010 |

OTHER PUBLICATIONS

Shen, Z., Peng H., Nygren M., "Formidable Increase in the Hampshire, "Silicon nitride ceramics—review of structure, processing and properties", J of achievements in materials and manufacturing engineering, vol. 24, issue 1, (Sep. 2007).* Superplasticity of Ceramics in the Presence of an Electric Field", Advanced Materials, vol. 15, No. 12, p. 1006-1009, Jun. 17, 2003.

(56) References Cited

OTHER PUBLICATIONS

Shen, Zhijian, et al., Conversion from Nano—to Micron-Sized Structures: Experimental Observations, Journal of the European Ceramic Society, vol. 24, pp. 3447–3452, Dec. 31, 2004, Stockholm, Sweden.
Shen, Zhijian, et al., "Formidable Increase in the Superplasticity of Ceramics in the Presence of an Electric Field", Advanced Materials, Jun. 16, 2033, vol. 15, Issue 12, pp. 1006-1009.
Lu, Xin, et al., "Study on Thermal Conductivity of SPS-Sintered Si3N4 Ceramics after Heat-Treatment", Materials Science Forum, Jan. 2005, vols. 475-479, 1279-1282.
Shen Z. et al. "Conversion from nano—to micron-sized structures: experimental observations" Journal of the European Ceramic Society, Elsevier Science Publishers, Barking, Essex. GB, vol. 24, No. 12, Jan. 1, 2004 pp. 3447-3452, XP004504460 ISSN: 0955-2219.
Shen Z. et al. "Formidable Increase in the Superplasticity of Ceramics in the Presence of an Electric Field" Advanced Materials 20030617 Wiley-VCH Verlag DE, vol. 15, No. 12, Jun. 17, 2003, pp. 1006-1009, XP002529289.
Herrmann M. et al. "Silicon Nitride Materials with Low Friction Coefficients" Key Engineering Materials Trans Tech Publications Switzerland, vol. 161-163, 1999, pp. 599-602, XP008106476 ISSN: 1013-9826.
Xin Lu et al. "Study on Thermal Conductivity of SPS-sintered Si3N4 Ceramics after Heat-treatment" PRICM-5: The Fifth Pacific Rim International Conference on Advanced Materials and Processing; Nov. 2-5, 2004, Beijing, China, Trans Tech Publ, Uetikon-Zurich, vol. 475-479, Jan. 1, 2005, pp. 1279-1282, XP008106480 ISBN: 978-0-87849-960-1 [retrieved on Jan. 15, 2005].
Sivakumar R. et al. "Thermal conductivity of combustion synthesized [beta]-sialons" Ceramics International May 2009 Elsevier Ltd.; Elsevier Advanced Technology; The Boulevard GB, vol. 35, No. 4, Aug. 5, 2008, pp. 1391-1395, XP002529291.
Bai et al. "Comparative study of beta-Si3N4 powders prepared by SHS sintered by spark plasma sintering and hot pressing" Journal of University of Science and Technology Beijing, Mineral, Metallurgy, Material, vol. 14, No. 3, Jun. 1, 2007, pp. 271-275, XP022934710 ISSN: 1005-8850 [retrieved on Jun. 1, 2007].

\* cited by examiner

*Primary Examiner* — Karl Group
(74) *Attorney, Agent, or Firm* — Bryan G. Pratt; Holland & Hart LLP

(57) ABSTRACT

The invention concerns a sintered ceramic component of silicon nitride or sialon suitable as rolling element in a bearing and a manufacturing method for making such ceramic components. The ceramic component has high density and a homogeneous and fine microstructure, giving the component excellent mechanical properties. Manufacturing of the sintered ceramic component by SPS is cost-effective and rapid.

10 Claims, 2 Drawing Sheets

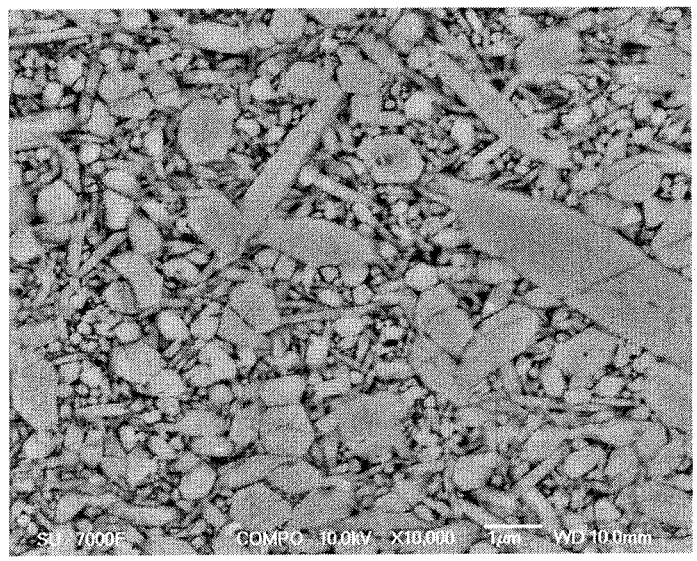
Figure 1.
Figure 2a.
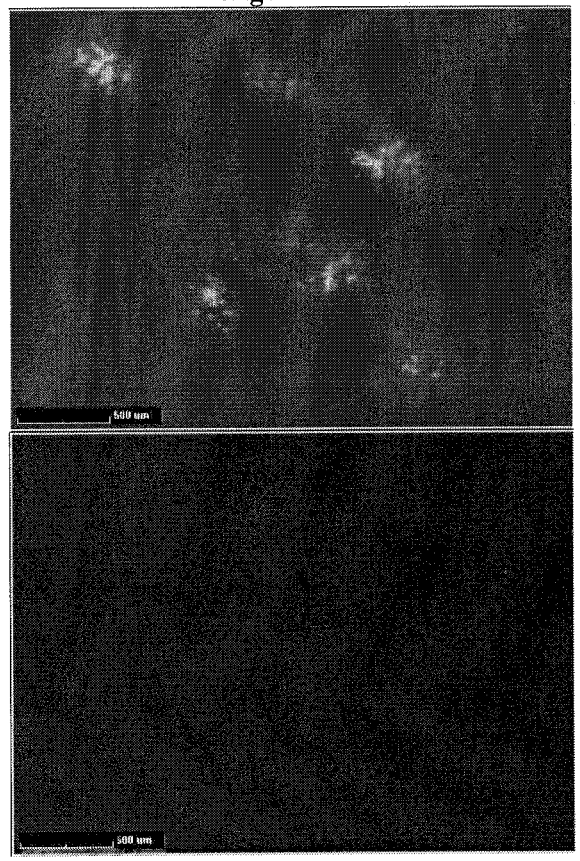
Figure 2b.

Figure 3a.
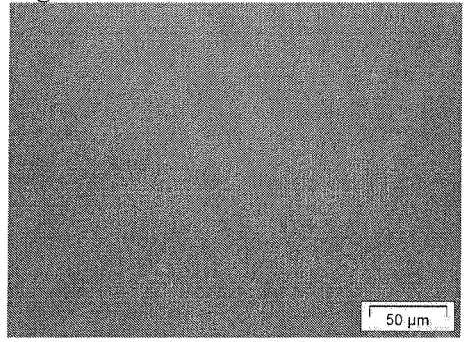
Polished microstructure of a section of the sample from Example 1.
Figure 3b.
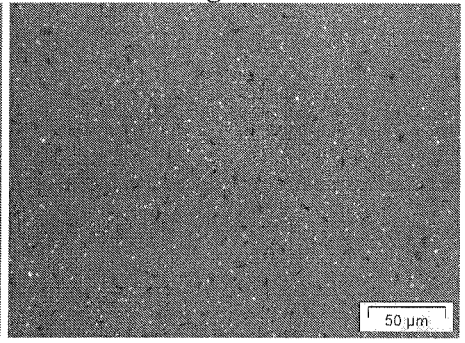
Polished microstructure of conventional high quality silicon nitride
Figure 3c.
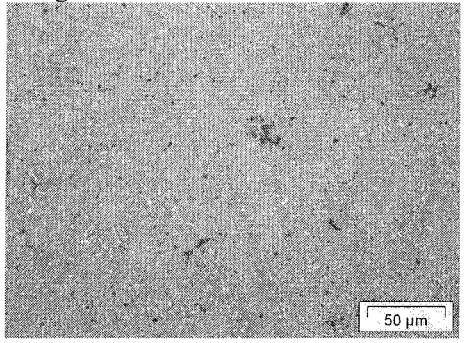
Polished microstructure of conventional medium quality silicon nitride
Figure 3d.
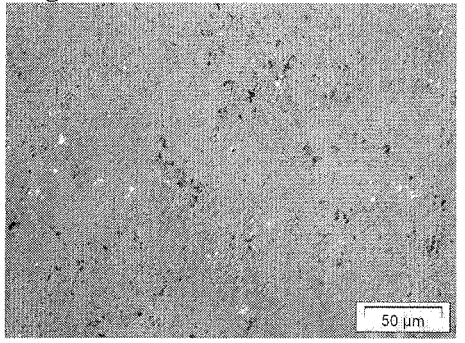
Polished microstructure of conventional medium quality silicon nitride
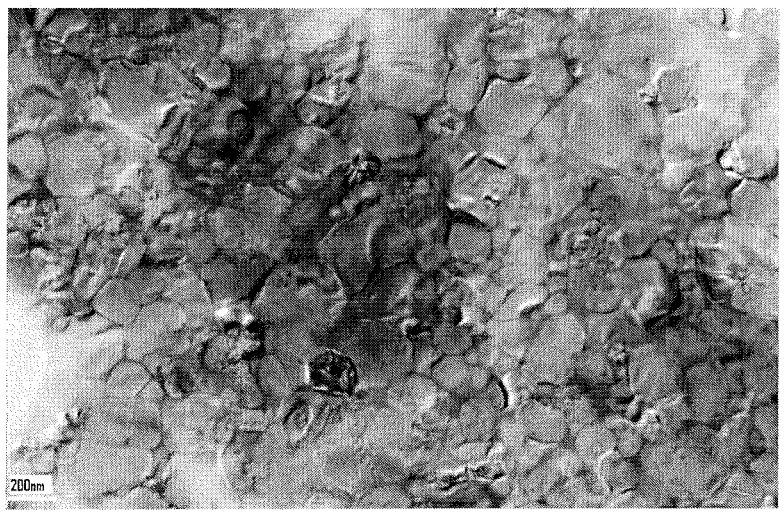
Figure 4.

LARGE CERAMIC COMPONENT AND METHOD OF MANUFACTURE

FIELD OF THE INVENTION

The invention relates to large sintered ceramic components, such as rolling bearing elements, and a method for manufacturing the same.

BACKGROUND OF THE INVENTION

Sintered ceramic components are used instead of metallic parts in applications where properties such as high hardness, excellent high temperature behaviour, high thermal shock resistance, low density and high electrical insulating capacity are desired.

Some applications put extreme demands on the components, for example rolling bearings in which contacting parts, between rolling elements and rings, are exposed to high and local stresses. The contacting parts are also exposed to various lubrication, contamination and temperature conditions. Reliable performances and long operating life is critical. So called hybrid bearings consist of ceramic rolling elements and steel based rings with steel, plastic or brass-based cages. Hybrid bearings have shown benefits in certain operation conditions, such as high rotation speed, starved or poor lubrication conditions, high solid contamination conditions and conditions where electric current is passing through the bearings. A combination of high relative density, hardness, fracture toughness and strength appears necessary in order to design ceramic rolling elements for such applications. The mechanical properties of ceramic materials can be very good, but they are greatly influenced by internal as well as surface defects, such as inclusions of foreign matter, pores, large grains and cracks, and these features will define their reliability.

A rolling bearing consists of rolling elements such as balls, cylindrical rollers, spherical rollers, taped rollers and needles, between an inner ring and an outer ring.

The raw material for production of ceramic components is a powder produced through milling of the constituents in a liquid and subsequent drying of the slurry. The drying can be performed through, e.g., spray drying or freeze drying. It is common that the powder for bearing components is silicon nitride based. Small amounts of rare earth powder can be added for liquid phase sintering in the case of silicon nitride and sialons (silicon nitride based material where silicon and nitrogen are substituted with aluminium and oxygen). For formation of ceramic components in conventional processes, organic additives are often used as binders for forming green bodies by dry pressing or cold isostatic pressing. The organic additives need to be removed by burning the ceramic green body before final densification. For large ceramic components this process can take a long time and is more difficult for large bodies than for small or medium size components.

Several grades of ceramics for bearing parts have been developed and are available on the market. There is an increasing demand for large ceramic bearing components of good quality for various bearing applications. Silicon nitride and sialon are light, hard and strong engineering ceramics.

Silicon nitride and sialon bearing components are today primarily produced through hot isostatic pressing (HIP) or gas pressure sintering (GPS), methods where high sintering temperatures are combined with high pressure.

Manufacturing larger ceramic components of good quality for bearing applications tends to present challenges for pressing of the green bodies and the sintering process results in a costly product. Using cheaper raw materials and lower pressures during the sintering tend to yield insufficient or at least deteriorated mechanical properties which introduce limitations in the reliability and performance for demanding bearing operations.

The HIP process requires complicated capsules for enclosing the powder to be pressed and the pressing cycle is slow and has high energy consumption. The total production cycle for making large ceramic components using HIP is therefore several hours for each batch. A normal batch time cycle for a HIP produced component is around 8 hours and increasing for larger objects, making sintering of larger components very time consuming.

In gas pressure sintering the powder is first compressed at conventional pressures in order to close all surface pores and thereby avoid gas penetration during the second step when the pressure is raised. Sintering is mainly performed during the second step with high pressure and the pressure is normally kept at a high level also during cooling. The method is time and energy consuming with cycle times of several hours. Increasing the size of the sintered components leads to an exponential increase of time and energy consumption.

Much of the development of ceramic bearings has specifically been addressing small ceramic bearing components used in e. g. computer hard disk drives or other applications where low vibration operation is of high importance. Sintering of larger ceramic components is difficult through conventional methods. Inhomogeneous structures and difficulties with the densification are major problems as well as high costs, long production cycle times and high energy consumption.

Electric pulse assisted consolidation (EPAC) includes processes based on heating the material to be sintered with a pulsed DC current. Other names commonly used for this technique are spark plasma sintering (SPS), pulsed electric current sintering (PECS), field assisted sintering technique (FAST), plasma-assisted sintering (PAS) and plasma pressure compaction ($P^2C$). These technologies will in this document hereafter be referred to as SPS. In SPS a uniaxial pressure is applied while the sample is being heated. The heating occurs through electrical energy pulses that are applied to the powder which is placed in a die between graphite punches. This sintering method allows the production of dense materials, while applying high heating rates and short dwell times. The technique uses a combination of high current and low voltage. A pulsed DC current with typical pulse durations of a few ms and currents of 0.5-30 kA flows through the punches, die and, depending on the electrical properties of the specimen, also through the specimen. The electrical pulses are generated in the form of pulse packages where the on: off relation is in the region of 1:99 to 99:1, typically 12:2 (12 pulses on, 2 off). The pressure is applied on the punches in a uniaxial direction, and is normally between 5 and 250 MPa.

U.S. Pat. No. 5,622,905 and U.S. Pat. No. 5,698,156 describe silicon nitride based bodies with uniform, fine crystal grains. The silicon nitride powder used should consist of grains smaller than 200 nm or grains having an amorphous structure. The ultrafine powder is prepared by chemical vapour deposition. The sintering temperature for silicon nitride powder is between 1200 to 1400° C. or between 1400 to 1900° C. or even higher temperatures if the total time times temperature is below 600000° C. sec. The SPS process can be used for manufacturing the bodies. A problem with this method is that it requires an expensive treatment, like chemical vapour deposition of the starting powder in order to ensure a fine grain size of the resulting product. It will also be difficult to use this method for larger components since that will require longer dwelling times which will not be compatible with the very fine grain structure.

U.S. Pat. No. 5,720,917 describes a method for making cheaper high quality silicon nitride products by adapting the manufacturing process so that less pure silicon nitride starting material can be used. The silicon nitride and sintering aids can have a metal impurity level up to 5000 ppm and can be treated at a sintering temperature of 1300 to 1900° C. and the product of sintering temperature and sintering time shall be between $10^5$ to $10^{6\circ}$ C. sec.

U.S. Pat. No. 6,844,282 and U.S. Pat. No. 7,008,893 describe silicon nitride based sintered bodies with a particle size below 100 nm and very low friction coefficient. The method of production comprises pulverizing and mixing a silicon nitride powder, a sintering aid a metallic titanium powder and a graphite/carbon powder to a very small particle size, below 30 nm. The powder compact shall be sintered in a nitrogen atmosphere with a pressure between 0.05 to 1 MPa.

The Chinese patent CN1793042 presents spark plasma sintered silicon nitride with high rigidity and high tenacity. The silicon nitride comprises additives of rare earth oxides, alumina and aluminium nitride.

There is an increased demand for ceramic alternatives to metallic bearings for applications that require larger size components. Bearings are being used in applications where properties such as low weight, excellent mechanical properties and electrical insulation have high priority. Some of the properties of the ceramic bearings are also favourable for more environmentally friendly solutions, as for example a lower bearing weight may lead to reduced energy consumption. In order to use ceramic bearings on a larger scale the quality of the larger ceramic bearings has to be improved as well as the cost for producing these bearings must come down.

DESCRIPTION OF THE INVENTION

The object of the present invention is to provide ceramic components, such as rolling elements for bearings, which have homogeneous microstructure with a minimum of defects and good mechanical properties and which can sustain high requirements from rolling contact mechanical loading including vibrations.

Another object is to provide ceramic components which have a size that makes them possible to use as rolling elements in large bearings, such as, for example, bearings in large compressors and wind power turbines.

Another object of the invention is a method for manufacturing large high quality ceramic components and especially a method which is cost effective and can operate faster and with lower power consumption than the manufacturing methods presently used for making large ceramic components.

The objectives are realised by a sintered ceramic component having a homogeneous, fully or near fully dense structure with less than 1 vol % porosity, or less than 0.2 vol %. The possible pores remaining in the structure shall be evenly distributed or only observed in the very core of the component (over a region of maximum 25% of the component diameter) and the structure shall practically be without so called snowflakes. A snowflake is the designations for a local region of incomplete densification, visualized through refraction of a fluorescent penetrate under UV-light. The amount of secondary phases shall be low. The volume fraction of the secondary ceramic phase shall be typically below 0.2% vol, and more often below 0.06% vol. Secondary phases may be unreacted powder, or side products formed during the sintering process.

The microstructure can be in the form of equi-axial or elongated grains embedded in an amorphous grain boundary phase, the grains and the grain boundary phase constituting a matrix. Elongated grains should preferably be isotropically distributed in three dimensions. The grains can have sizes from the nanometer scale up to the micrometer scale. If pores are present, they shall have a maximum size of 10 μm.

The sintered ceramic component can be made of silicon nitride, sialon or mixtures thereof The ceramic powder may comprise additives of a maximum amount of 10 wt % of other compounds, such as yttria, other rare earth oxides, zirconia, aluminium nitride, aluminium oxide and/or oxynitrides of silicon and aluminium for the silica and silicon nitride.

The manufacturing of the sintered ceramic components comprises preparation of a powder mixture without organic additives present, or at least less than 1 weight % of organic additives. The powder can be prepared by conventional powder preparation techniques, such as milling. The powder is prepared for sintering without being encapsulated. The spark plasma sintering technique (SPS) is used for manufacturing the ceramic components. SPS combines rapid heating, a short holding time at the desired sintering temperature and a high pressure for sintering of the ceramic components. This processing method enables tailoring of the microstructure of the ceramic components.

In order to manufacture sintered ceramic components with a dimension that in at least one direction is exceeding 30 mm, the pressure used during the process is between 5 and 150 MPa, preferably between 5 and 70 MPa. The heating rate applied is between 5 and 600° C. min$^{-1}$, preferably 50-200° C. min$^{-1}$. The sintering temperature and time are chosen so that a total or near total densification, implying a density exceeding 99%, will occur. The process can take place in one or several steps in the sintering unit, in which steps the temperature and the pressure can be changed from one step to another. The process involving several steps can be performed so that the first step involves sintering of the component to a total or near total densification and a subsequent step involves grain growth at a slightly higher temperature and lower pressure to achieve a desired microstructure, such as a three dimensional needle structure. The densification step can be performed at a temperature between 1500 to 1600° C. and a pressure between 30 to 150 MPa and in the second grain growth step the temperature can be between 1600 to 1750° C. and the pressure below 30 MPa.

The possibility to manufacture high quality sintered ceramic components having a dimension in at least one direction exceeding 30 mm, enables components, such as for example rolling elements for bearings, having extremely high requirements on mechanical stability to be produced. The combination of materials used and the controlled sintering process has many advantages and enables production of high quality ceramic components with an overall short process time. The time for heating the components is greatly reduced and thereby also the energy consumption for the whole process. Due to the simple preparation of the powder, the pressing of the powder basically without organic additives and the possibility to sinter without encapsulating the powder, the amount of installations needed for manufacturing the components are reduced and thereby also the need for shop floor space. The invention enables a cost effective production of high quality sintered ceramics.

Although the invention enables manufacturing of large ceramic components, it can also be applied for smaller components with sizes in at least one direction down to 10 mm.

BRIEF DESCRIPTION OF THE FIGURES

FIG. 1. Scanning electron micrograph of a chemically etched sialon material prepared according to Example 1 below.

FIG. 2. Micrographs of sialon specimens under UV-light showing: a) A poor sample with many large areas of local region of micro-defects, so called snowflakes. b) An acceptable sample with no (or isolated, very small) snowflakes.

FIG. 3. Comparison of microstructures between specimens of the present invention and prior art.

FIG. 4. A micrograph of a $Si_3N_4$ sample

DETAILED DESCRIPTION OF THE INVENTION

Ceramic rolling elements for bearings and especially elements of large sizes, such as elements having a diameter of 30 to 60 mm or even larger can be made of silicon nitride, sialons (silicon nitride based material where silicon and nitrogen are substituted with aluminium and oxygen), mixtures thereof. Further, additives such as yttrium oxide (yttria), other rare earth oxides, zirconium oxide (zirconia), aluminium nitride and aluminium oxide (alumina) can be included up to a maximum amount of 10 wt %.

The powder mixing process is performed without organic additives, or with a maximum of 1 weight % organic additives. Compared to conventional processes using organic binders, the process of the present invention comprises a purer end product without residues from organic additives as well as a more environmentally friendly process (no carbon dioxide emission). The low amount or the total absence of organic additives will prevent carbon formation and potential entrapment within the ceramic component during densification. The grains of the sintered material can contain one single crystal phase or be a mixture of different crystal phases, and further an amorphous grain boundary phase is present in the matrix.

In order to reduce the impact of prolonged heating on the elements, the spark plasma sintering (SPS) technique is used that combines rapid heating, a short holding time at the desired sintering temperature and a high pressure for sintering of the ceramic components.

The pressure used during the process is between 5 and 150 MPa, preferably between 5 and 70 MPa. The heating rate applied is between 5 and 600° C. min$^{-1}$, preferably 30-150° C. min$^{-1}$. The sintering temperature and time are chosen so that a total or near total densification will occur (>99% of the theoretical density). This step can be verified by taking samples of desired combinations of size and composition for a component. The densification process can take place in one or several steps in the sintering unit, in which steps the temperature and the pressure can be changed. A first step at a first temperature and a first pressure allows for densification of the body and a second step with a second, higher, temperature and a second, lower, pressure allows for controlled grain growth for silicon nitride and sialon based materials.

The SPS processing method gives the ability to tailor the microstructure of the produced material. Using conventional sintering processes, such as for example hot pressing or HIP, densification is accompanied by grain growth and liquid phase reactions. Due to the rapid densification with SPS, the grain growth can be disconnected from the densification. The possibility to rapidly change the temperature as well as the pressure with SPS allows for control of the grain growth. For sialon and silicon nitride, the crystallinity of the grains and thereby the grain morphology is influenced by the sintering temperature. Generally for silicone nitride and sialons, higher temperature gives more β-phase and thereby more elongated grains and further, the grain size increases with temperature. With SPS, both an equi-axed grain structure and self-reinforced materials with elongated grains (an analogue to whisker-reinforced materials) are possible to form through the controlled grain growth. Elongated β-phase grains subjected to controlled grain growth are highly desired to improve the fracture toughness of sialons and silicon nitride materials.

The rolling elements show an excellent combination of high hardness and high indentation fracture toughness also for components having a diameter larger than 30 mm. Rolling elements with 60 mm diameter are produced in all together less than 2 hours and smaller elements with a diameter around 20 mm can be produced in 30 minutes. Further, a fully dense or nearly fully dense material is obtained (a density of at least 99% of the theoretical density), with absence of or a very low content of so called snowflakes (refraction of a fluorescent penetrate under UV-light due to local micro-defects) and with fine-grained structure. This invention is showing that high quality ceramic components of large dimensions, over 20 mm or 30-60 mm or even larger, can be made. Conventional manufacturing of larger components by HIP or GPS is more time consuming due to the slow heating process, and problems with obtaining fully dense materials as well as homogenous microstructures occur.

The sialon and silicon nitride materials used for the sintered ceramic components preferably have high β-phase content, the β-phase generally exceeding 50 weight %. The β-phase content is controlled by the sintering parameters. A suitable sintering temperature is chosen after test samples have been evaluated. The β-phase grains are elongated and can form a strong three-dimensional network structure. The presence of elongated β-grains can be seen as the light grey areas in the scanning electron micrograph of FIG. 1.

For the silicon nitride and sialon materials, and mixtures thereof, the sintering takes place between 1300 and 1750° C. The sintering temperature used for silicon nitride and sialon shall in at least one step of the manufacturing process be between 1500 and 1750° C. and preferably between 1600 and 1750° C.

Typical holding times at the desired temperature are from 5 minutes for components with a 15 mm-diameter to up to 40 to 60 minutes for components with a 60 mm diameter. Longer holding times may be applied for even larger components and samples produced in multiple-sample moulds.

An embodiment of the method of the present invention comprises the following: i) inserting the powder material or a pre-formed green body in an electrically conducting graphite chamber comprising a die and punches; (ii) applying a uniaxial pressure on the two electrically conducting punches of the graphite chamber, thereby applying a pressure on the material; (iii) heating the material with a pulsed electrical energy, going through the punches and the electrically conducting die. The sintering procedure includes a high heating rate (a steep heating ramp) and a short holding time at the desired sintering temperature. The cooling down of the sample can either be programmed or the sample will cool down automatically as the current is switched off.

The sintered ceramic components have been analysed after being cut and polished through conventional methods.

For the silicon nitride and sialon based components, the Vicker's hardness $HV_{10}$ is in the region 1550-2200 kgmm$^{-2}$, typically 1600-2000 kgmm$^{-2}$, the fracture indentation toughness is between 4.5 and 10.0 MPam$^{1/2}$, typically 5.0-8.0 MPam$^{1/2}$ and the 4-point bending strength between 600 and 1000, typically 810 MPa. The components are free of so called snowflakes.

FIG. 2 a and b show how snowflakes are visualised under UV light. FIG. 2a shows a poor sample with many large areas having regions of micro-defects, so called snowflakes, in the structure. In FIG. 2b an acceptable microstructure having no or only isolated very small snowflakes is shown.

Further, the porosity is below 1%, typically less than 0.02% of the volume. The pores should have a maximum size of 10 µm and, if present, they should be evenly distributed or only observed in the very core of the component, over a region of maximum 25% of the component diameter.

An example of the porosity and homogeneity of a sample of the present invention, compared to conventional sialon and silicon nitride samples, is shown in FIG. 3 a-d. FIG. 3a shows a polished sample from Example 1. The micrograph shows that the sample is basically free from pores and does not show much secondary phases. The other conventionally manufactured silicon nitride materials can show various degrees of secondary phases distributed in the silicon nitride matrix. FIG. 3b shows a fairly high amount of light coloured and dark coloured phases of coarser size evenly distributed in the silicon nitride matrix. FIG. 3c shows a microstructure where the light coloured secondary ceramic phase is still very fine but with a very dense distribution (high fraction volume) while the darker coloured ceramic phase forms clusters of coarser sizes. FIG. 3 d shows a microstructure where both the light coloured and dark coloured phases have clustered distribution of coarser sizes. Coarse size and clustered distribution of secondary phases are in-homogeneities in the silicon nitride matrix that can affect the strength, local hardness and crack propagation.

Rolling elements can be in the shape of rollers, balls, tapers and needles. Typical sizes for the rolling elements are a diameter between 10 and 65 mm and for the non-spherical components, a length between 6 and 70 mm.

EXAMPLES

Example 1

A powder was produced through mixing of 91 wt % $Si_3N_4$ ($d_{50}$<0.5 µm), 5 wt % $Y_2O_3$ ($d_{50}$<0.9 µm) and 4 wt % $SiAl_6O_2N_6$ ($d_{50}$<2.50 µm). The powder was mixed in a liquid medium and freeze dried. The powder was inserted in a graphite die chamber and the chamber was closed by two punches. The powder was sintered in a SPS unit and the temperature was initially automatically raised to 600° C. Subsequently, a heating rate of 100° C. min$^{-1}$ was applied. The sample was first densified at 1550° C. for three minutes and thereafter treated at a a second temperature of 1730° C. for five minutes. The temperature was measured with an optical pyrometer focused on the surfaces of the sintering die. The sintering took place under vacuum. The pressure was kept at 50 MPa during the first densification step and was lowered to 5 MPa in the second temperature treatment step.

A sialon component was formed with a Vicker's hardness, $HV_{10}$, of about 1800 kg mm$^{-2}$ and a fracture toughness, $K_{1c}$, of 6.4-6.8 MPa·m$^{1/2}$. Anisotropy on the fracture indentation toughness was checked and less than 5% between the direction parallel and perpendicular to the pressure direction, the weakest direction still showed minimum fracture indentation toughness above 6 MPa·m$^{1/2}$. 4-point bending strength was estimated, from bi-axial strength tests, to about 810 MPa with a Weibull parameter of about 9. The microstructure showed no visible pores under optical microscopy up to magnification of 200× on polished samples, limited or no secondary phase and no snowflakes.

The sintered component has a mixture of 80 wt % β-sialon and 20 wt % α-sialon, measured by X-ray powder diffraction. Instead of using the additive $SiAl_6O_2N_6$, a combination of $Si_3N_4$, AlN and $Al_2O_3$ can be used, and instead of using a combination of $Si_3N_4$ and additives, sialon powder can be used for the same purpose.

Example 2

A powder was produced through mixing of 91 wt % $Si_3N_4$ ($d_{50}$<0.5 µm), 5 wt % $Y_2O_3$ ($d_{50}$ <0.9 µm) and 4 wt % $SiAl_6O_2N_6$ ($d_{50}$<2.50 µm). The powder was mixed in a liquid medium and freeze dried. 159 g of the powder was inserted in the graphite die chamber with a diameter of 34 mm and the chamber was closed by two punches. The powder was sintered in a SPS unit with a heating rate of 30° C. min$^{-1}$. The sample was densified at 1650° C. for 30 minutes. The temperature was measured with an optical pyrometer focused on the surfaces of the sintering die. The sintering took place under vacuum. The pressure was kept at 40 MPa.

A sialon component was formed with a Vicker's hardness, $HV_{10}$, of about 1700 kg mm$^{-2}$ and a fracture toughness, $K_{1c}$, of about 6.7 MPa·m$^{1/2}$. Anisotropy on the fracture indentation toughness was checked and less than 11% between the direction parallel and perpendicular to the pressure direction, the weakest direction still showed minimum fracture indentation toughness above 5.7 MPa·m$^{1/2}$. The microstructure showed no visible pores under optical microscopy up to a magnification of 200× on polished samples, limited or no secondary phase and no snowflakes. Only a small 5 mm diameter area in the very core of the component showed few pores with sizes up to 10 µm and a pore fraction volume of maximum 0.2% locally, and more often below 0.06 vol %.

The final dimensions of the cylindrical component were ø34×54 mm.

Example 3

A powder was produced through mixing of 91 wt % $Si_3N_4$ ($d_{50}$<0.5 µm), 5 wt % $Y_2O_3$ ($d_{50}$<0.9 µm) and 4 wt % $SiAl_6O_2N_6$ ($d_{50}$<2.50 µm). The powder was mixed in a liquid medium and freeze dried. The powder was sintered in a SPS unit with a heating rate of 30° C. min$^{-1}$. The sample was densified at 1600° C. for 30 minutes. The temperature was measured with an optical pyrometer focused on the surfaces of the sintering die. The sintering took place under vacuum. The pressure was kept at 40 MPa.

A sialon component was formed with a Vicker's hardness, $HV_{10}$, of about 1700 kg mm$^{-2}$ and a fracture toughness, $K_{1c}$, of 7 MPa·m$^{1/2}$. Anisotropy on the fracture indentation toughness was checked and less than 11% between the direction parallel and perpendicular to the pressure direction, the weakest direction still showed minimum fracture indentation toughness above 5.7 MPa·m$^{1/2}$. The microstructure showed no visible pores under optical microscopy up to a magnification of 200× on polished samples, limited or no secondary phase and no snowflakes. Only a small 7 mm diameter area in the very core of the component showed few pores with sizes up to 10 µm and a pore fraction volume of maximum 0.2% locally and more often below 0.06 vol %.

The final dimensions of the cylindrical component were ø42×67 mm.

Example 4

A powder was produced through the mixing of 90 wt % $Si_3N_4$ ($d_{50}$<0.5 µm), 5 wt % $Y_2O_3$ and 5 wt % $Al_2O_3$. The powder was prepared by the standard technique of ball milling of a mixture in a liquid medium and freeze dried. The powder was densified in the SPS unit at 1500° C. for 3 minutes. The resulting component consists of $Si_3N_4$. The component was already after 3 minutes regarded as fully dense. FIG. 4 is a transmission electron micrograph of the sample, showing the lack of pores.

The invention claimed is:

1. A bearing comprising:
a rolling element sintered by an electric pulse assisted consolidation (SPS) process, said rolling element comprising silicon nitride, sialon or mixtures thereof and up to 10 weight % of rare earth oxides, aluminium nitride, aluminium oxide and/or oxynitrides of silicon and aluminium as additives, characterized by that the rolling element has a homogeneous microstructure and a density that is at least 99% of the theoretical density, a maximum pore volume of 1 volume %, and a secondary ceramic phase fraction volume not exceeding 0.2 volume %, wherein the secondary ceramic phase comprises unreacted powder or side products formed by sintering the rolling element;
wherein said rolling element has a diameter of at least 30 millimeters.

2. The bearing according to claim 1, wherein any pores remaining in the rolling element are evenly distributed.

3. The bearing according to claim 1, characterized by that the rolling element has a beta-phase content exceeding 50 weight %.

4. The bearing according to claim 3, characterized by that the homogeneous microstructure comprises elongated beta-grains forming a three-dimensional network.

5. The bearing according claim 1, wherein the rolling element has a maximum pore volume of 0.2 volume %.

6. The bearing according to claim 1, wherein the rolling element has a secondary ceramic phase fraction volume not exceeding 0.06 volume %.

7. The bearing according to claim 1, wherein any pores remaining are only within a core of the rolling element.

8. The bearing according to claim 7, wherein any pores remaining are within 25% or less of the diameter of the rolling element.

9. The bearing according to claim 1, wherein any secondary ceramic phase fraction remaining in the rolling element is evenly distributed.

10. A bearing comprising:
a rolling element sintered by an electric pulse assisted consolidation (SPS) process, said rolling element comprising silicon nitride, sialon or mixtures thereof and up to 10 weight % of rare earth oxides, aluminium nitride, aluminium oxide and/or oxynitrides of silicon and aluminium as additives, characterized by that the rolling element has a homogeneous microstructure and a density that is at least 99% of the theoretical density, a maximum pore volume of 1 volume %, and a secondary ceramic phase fraction volume not exceeding 0.2 volume %, wherein the secondary ceramic phase comprises unreacted powder or side products formed by sintering the rolling element;
wherein said rolling element has a diameter of at least 30 millimeters, any pores remaining are within 25% or less of the diameter, and any secondary ceramic phase fraction remaining is evenly distributed.

* * * * *